US008896484B2

(12) United States Patent
Frigon et al.

(10) Patent No.: US 8,896,484 B2

(45) Date of Patent: Nov. 25, 2014

(54) DYNAMIC RADIATION PATTERN ANTENNA SYSTEM

(75) Inventors: Jean-Francois Frigon, Brossard (CA); Christophe Caloz, Montreal (CA)

(73) Assignee: Polyvalor, Limited Partnership, Monreal, Quebec (CA)

( * ) Notice: Subject to any disclaimer, the term of this patent is extended or adjusted under 35 U.S.C. 154(b) by 0 days.

(21) Appl. No.: 13/315,506

(22) Filed: Dec. 9, 2011

(65) Prior Publication Data

US 2012/0081251 A1 Apr. 5, 2012

Related U.S. Application Data

(62) Division of application No. 11/947,759, filed on Nov. 29, 2007, now Pat. No. 8,094,074.

(51) Int. Cl.

*H01Q 3/00* (2006.01)
*G01S 5/02* (2010.01)
*H01Q 15/00* (2006.01)
*H01Q 3/26* (2006.01)
*H01Q 13/20* (2006.01)

(52) U.S. Cl.

CPC ............. *H01Q 3/26* (2013.01); *H01Q 15/0066* (2013.01); *H01Q 13/20* (2013.01); *H01Q 15/0086* (2013.01)

USPC ........................................... 342/372; 342/369

(58) Field of Classification Search

USPC ............................ 342/81, 157, 369, 371, 372

See application file for complete search history.

(56) References Cited

U.S. PATENT DOCUMENTS

2006/0267839 A1* 11/2006 Vaskelainen et al. ......... 342/368
2007/0091008 A1 4/2007 Mortazawi et al.
2007/0142004 A1 6/2007 Yokoi et al.
2007/0210974 A1 9/2007 Chiang

FOREIGN PATENT DOCUMENTS

WO 2007/127955 A2 11/2007

OTHER PUBLICATIONS

L. Petit, L. Dussopt, and J.M. Laheurte, "MEMS-Switched Parasitic-Antenna Array for Radiation Pattern Diversity", IEEE Trans. Antennas Propagat,. vol. 54, pp. 2624-2631, Sep. 2006.

A. Forenza and R. W. Jr. Heath, "Benefit of Pattern Diversity Via Two-Element Array of Circular Patch Antennas in Indoor Clustered MIMO Channels," IEEE Trans. Commun., vol. 54, pp. 943-954, May 2006.

T. Svantesson, "Correlation and Channel Capacity of MIMO Systems Employing Multimode Antennas," IEEE Trans. Veh. Technol., vol. 51, pp. 1304-1312, Nov. 2002.

L. E. Gurrieri, and S. Noghanian, "Multi beam Selection for Indoor MIMO Systems: Two Cases of Study," IEEE Trans. Antennas Propagat,. vol. 55, pp. 1173-1179, Apr. 2007.

S. Lim, C. Caloz and T. Itoh, "Metamaterial-Based Electronically Controlled Transmission-Line Structure as a Novel Leaky-Wave Antenna with Tunable Radiation Angle and Beamwidth," IEEE Trans. Microwave Theory Tech., vol. 52, pp. 2678-3690, Dec. 2004.

* cited by examiner

*Primary Examiner* — Dao Phan

(57) ABSTRACT

The present invention relates to a dynamic radiation pattern diversity antenna system comprising a transmission line, a plurality of varactor diodes, and a radiation pattern control unit. The transmission line defines a plurality of unit cells. Each varactor diode is electrically connected to a corresponding unit cell. The radiation pattern control unit is electrically connected to each of the plurality of varactor diodes, and controls the electrical actuation thereof. Upon electrical actuation of the varactor diodes, each unit cell radiates at an angle corresponding to a voltage applied to the corresponding varactor diode.

8 Claims, 4 Drawing Sheets

DYNAMIC RADIATION PATTERN ANTENNA SYSTEM

FIELD OF THE INVENTION

The present invention relates to antenna systems, and more particularly to antenna systems allowing dynamic radiation patterns.

BACKGROUND OF THE INVENTION

Wireless telecommunications are deeply integrated in today's lifestyle. The selection of tools, functionalities and units relying on wireless telecommunications is constantly widening, and requirements on wireless telecommunications is consistently increasing. In addition to the increase of requirements, prices of such units are dropping because of high demand, and fierce competition, making it essential for manufacturers to develop new technology manufacturable at lower costs.

In personal wireless units, most of the improvements to support more complex applications or functionalities have been invested in the elaboration of stronger encoding/decoding techniques. Such encoding/decoding techniques have proven to improve performances of wireless units, but however require more elaborate Digital Signal Processors, which in turn result in more expensive wireless units, and greater energy consumption.

An other alternative relies on multiple inputs multiple outputs (MIMO) communication systems. MIMO systems use multiple transmit and receive antennas to increase capacity in rich multipath channels. However, works on MIMO channel capacity have established the dependence of the system capacity on the statistical properties of the complex transfer matrix describing the MIMO channel, where this transfer matrix depends on both the propagation environment and the antenna configurations.

Efforts have also been invested on improving antennas used in such wireless units. To improve performances, many units rely on antennas composed of multiple elements, generating discrete radiation patterns. Although such antennas have provided noticeable improvements, such antennas have also demonstrated limited capabilities in harsh environments (i.e. slow fading, correlated MIMO channels), can not be dynamically adapted to a wide variety of wireless environments, and increase the size and cost of wireless units.

Thus, such limitations in current antennas and antenna systems force designers of wireless units to develop and rely on ever more complicated and sophisticated encoding schemes and algorithms to improve performances. There is therefore a need for an antenna and an antenna system which alleviates some of the problems encountered in today's antennas and antenna systems.

SUMMARY OF THE INVENTION

The present invention provides a dynamic radiation pattern antenna system. The dynamic radiation pattern antenna system comprises a plurality of antenna units, a control unit and an electronic interface. The plurality of antenna units has electronically controllable radiation patterns. The control unit is dynamically controlling the radiation pattern of the plurality of antenna units. And the electronic interface connects the plurality of antenna units to the control unit.

In another embodiment, the present invention provides a dynamic radiation pattern diversity antenna system. The antenna system comprises a transmission line, a plurality of varactor diodes and a radiation pattern control unit. The transmission line defines a plurality of unit cells. Each varactor diode is electrically connected to a corresponding unit cell. The radiation pattern control unit is electrically connected to each of the plurality of varactor diodes, and controls the electrical actuation thereof. Therefore, upon electrical actuation of the varactor diodes, each unit cell radiates at an angle corresponding to a voltage applied to the corresponding varactor diode.

BRIEF DESCRIPTION OF THE DRAWINGS

The present invention will be described herein through reference to the following Figures, in which similar references denote similar parts.

DETAILED DESCRIPTION OF THE INVENTION

Figure 1:
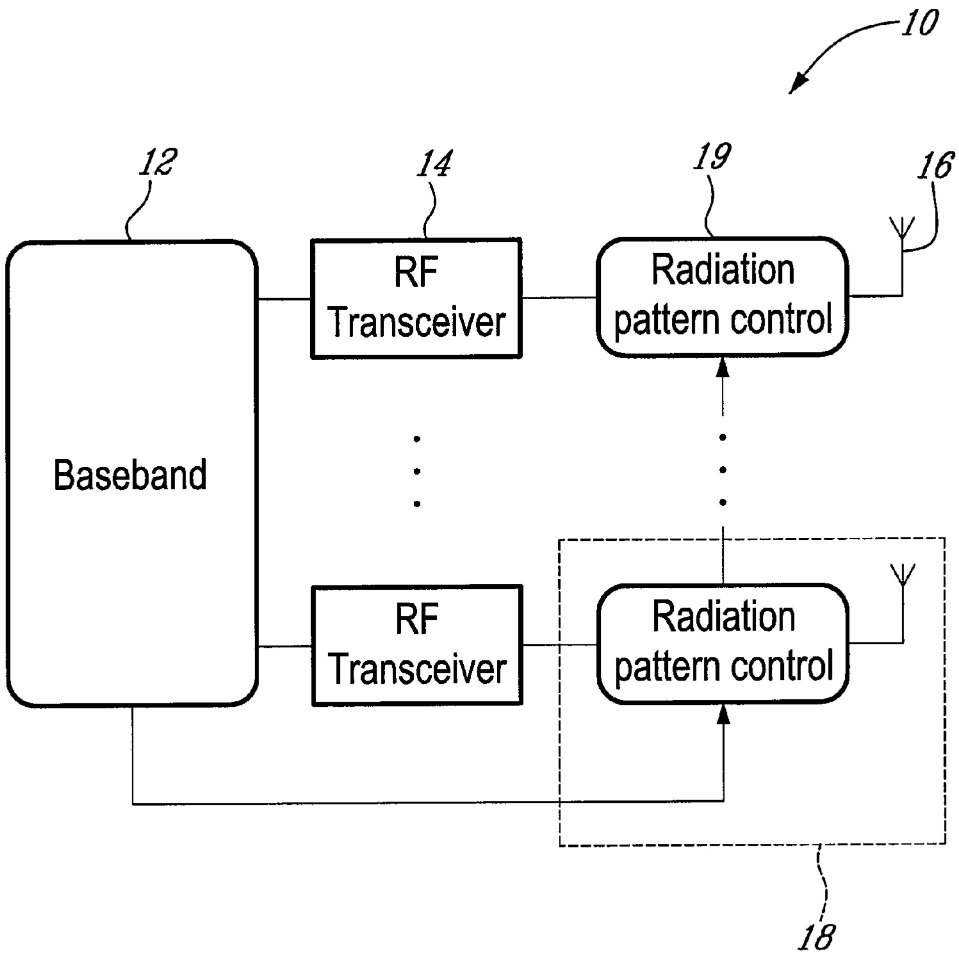
FIG. 1 is a schematic representation of a MIMO wireless system in accordance with the present invention.

A generic block diagram of an exemplary multiple input/multiple output (MIMO) wireless system 10 is illustrated in FIG. 1. The system 10 consists of a baseband digital signal processing unit 12, M transceiver RF modules 14 and M transmit/receive antennas 16. FIG. 1 also depicts the incorporation of the antenna 16 of the present invention in an antenna system 18, i.e. as the antenna 16 and radiation pattern control units 19. More particularly, the antenna system 18 of the present invention provides electronically controllable radiation pattern, with backfire-to-endfire full-space scanning, with in addition beam shaping.

Figure 2:
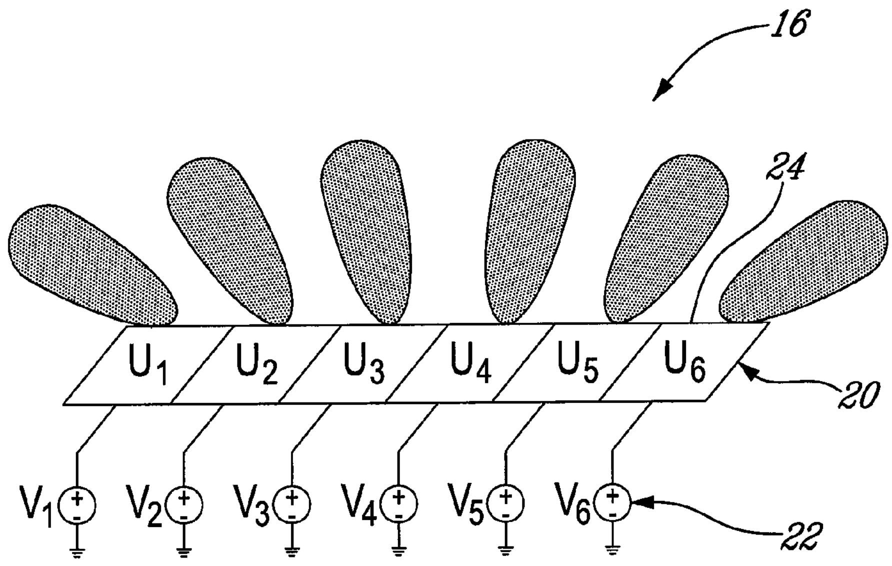
FIG. 2 is a schematical diagram of an embodiment of the antenna of the present invention.

Reference is now made concurrently to FIG. 2, which depicts physical principle of the antenna 16 of the present invention. The antenna 16 may use composite right/left handed (CRLH) microstrip leaky-wave (LW) transmission line (TL) 20 or any other similar type of antennas. The antenna could also be built using a metamaterial transmission line structure, as described in article titled "Metamaterial-Based Electronically Controlled Transmission-Line Structure as a Novel Leaky-Wave Antenna with Tunable Radiation Angle and Beamwidth" by Sungjoon Lim et al. in IEEE Transactions on Microwave Theory and Techniques, volume 52, no. 12, December 2004, pages 2678-2690. Alternatively, the antenna 16 may consist of a plurality of antenna units adapted to have radiation patterns electronically or electrically controlled in real-time.

Figure 3:
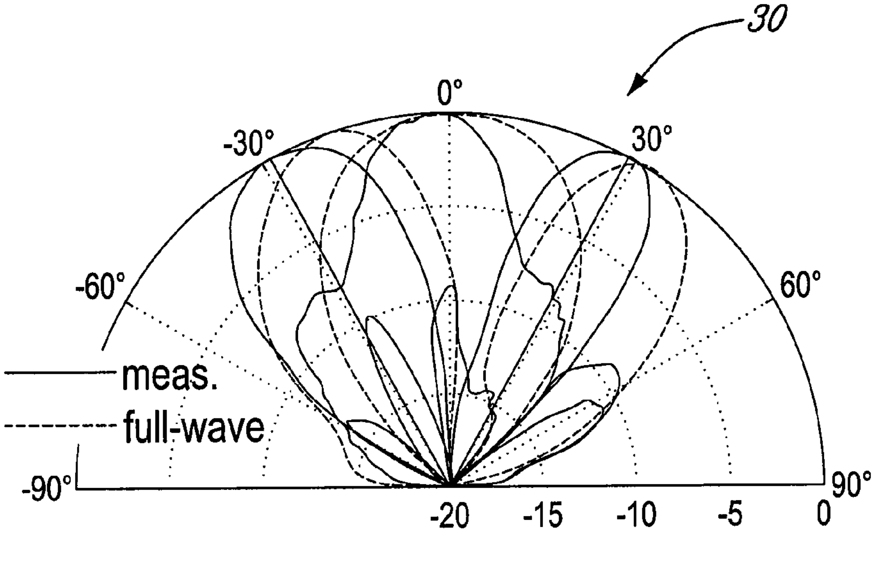
FIG. 3 depicts radiation patterns of the antenna of the present invention for different bias conditions.

The present invention relies on the particularities of the antenna 16 selected, i.e. the scanning angle being a function of the inductive and capacitive parameters of the distributed TL. Whereas in a traditional LW antenna the scanning angle is limited to a narrow range of angles, the CRLH TL antenna used in the antenna 16 and antenna system 18 of the present invention provides backfire-to-endfire full-space scanning capability. By incorporating varactor diodes 22 (i.e. capacitors with a capacitance varying as a function of their reverse-bias voltage) in the TL structure 20, the inductive and capacitive parameters can be changed. It is then possible, by electronically controlling the varactor diodes 22 reverse-bias voltages, to achieve full-space scanning at a fixed operation frequency. Alternatively, the varactor diodes 22 could be replaced by other electronic devices that can be used to vary the propagation properties of the TL and modify the radiation pattern. Furthermore, the TL structure 20 can be viewed as the periodic repetition of unit cells 24 with varactor diodes 22. By applying the same bias-voltage to all cells 24 it is possible to obtain a full-scanning range with maximum gain at broadside. On the other hand, by applying different bias-voltage (non-uniform biasing profile) to the cells 24, each cell 24 radiates toward a different angle (as depicted on FIG. 2), effectively creating an electronically controllable beamwidth antenna. The simulated and measured radiation patterns of the CRLH LW antenna 16 are also shown in FIG. 3. By electronically changing the bias-voltages of the antenna 16 of the present invention, it is thus possible to achieve a wide and continuous range of radiation patterns 30 for this single antenna 16. This is in contrast with other single feed antennas with selectable radiation patterns that only offer a discrete number of fixed radiation patterns.

From a mathematical standpoint, the wireless channel impulse response at time t is for antenna 16 can be computed with the following equation:

$$h(t,\tau)=\Sigma_i a_i(t)\delta(\tau-\tau_i(t))$$

where $\tau_i(t)$ is the delay associated at time t to multipath I and its time-varying gain $a_i$ (t) is given by:

$$a_i(t)=\alpha^s[\theta_i^s(t),\psi_i^s(t)]\beta_i(t)\alpha^r[\theta_i^r(t),\psi_i^r(t)]$$

where $$\frac{\alpha^s[\theta_i^s(t),\psi_i^s(t)]}{\alpha^r[\theta_i^r(t),\psi_i^r(t)]}$$

is the radiation pattern of the transmit/receive antenna 16 in the transmit/receive direction of multipath I, and $\beta_i(t)$ is the attenuation factor of multipath I, which includes the nature of the reflectors and the attenuation due to the total distance the wave propagates between the transmitter and the receiver. It is apparent that by modifying the transmit and/or the receive antennas radiation patterns 30, the gain $a_i(t)$ associated with each multipath is modified. Furthermore, multipaths usually arrive in clusters with time intervals smaller than the time resolution capabilities of the wireless communication systems. Within each of these clusters, the multipaths add constructively or destructively, giving rise to multipath fading. By changing the radiation patterns 30, the interaction between multipaths changes and thus modifies the multipath fade value. Changing the radiation patterns 30 therefore provides a diversity benefit, even for single input single output (SISO) communication systems.

Multiplexing Gain vs. Diversity Gain

In a MIMO communication system, the different paths between the multiple transmit and receive antennas 16 can be exploited to increase the multiplexing gain (i.e. the communication link transmission speed) or the diversity gain (i.e. the communication link reliability). A fundamental tradeoff exists between these two gains. Moreover, these gains are greatly reduced in the presence of a (Line of Sight) component in the received signals or if the paths attenuation factors are correlated. Finally, for a given channel realization, the multiplexing and diversity gains are directly dependent on the eigen values of the MIMO channel matrix. The ability to independently change the radiation patterns 30 of all transmit and/or receive antennas 16 provide the possibility to alleviate all these problems. For example, for a given multiplexing gain, the given diversity gain can be increased by properly processing the signals received for different radiation patterns, while a radiation pattern change can reduce the detrimental effect of the LOS component, mitigate the impact of an interference source, decorrelate spatial clusters of multipaths or provide a channel matrix with a better set of eigen values.

By considering the antennas an active part of a wireless communication system instead of a passive part lumped into the wireless channel, it is thus possible to greatly improve the system performances by dynamically adapting in real-time a transmission channel between a transmitter and a receiver. Furthermore, by using antennas systems as proposed in the present invention, it is thus possible to have access to a continuous range of radiation patterns 30 at a low cost and in a small form factor. Thus the antenna 16 of the present invention opens the door to a wide variety of applications to improve the performance of SISO and MIMO wireless systems.

Examples of Applications of the Antenna of the Present Invention

Such a type of antenna system is a particularly promising solution for wireless units, such as mobile radios, with strict size and cost constraints, due to their structural simplicity, easy fabrication, low-cost, broad-range scanning, and integrability with other planar components. By adopting a suitable IC implementation, the proposed antenna could be integrated on a single chip with an analog transceiver, antenna array, and a digital implementation of the scanning control algorithm.

The present invention further provides two simple radiation pattern control algorithms which aim at mitigating deep fades in slow fading environments or at selecting, via a feedback mechanism at the receiver, the radiation pattern which maximizes performances. The capacity of both algorithms has been derived and analyzed via numerical simulations. The obtained results demonstrate that the proposed antenna and antenna system provide a significant capacity improvement compared to conventional approaches. The algorithms could be integrated as modules in the radiation pattern control units 19 of FIG. 1, separately or jointly. The radiation pattern control units 19, although schematically represented as a series of radiation pattern control units 19, could also consist of a single radiation pattern control unit 19, controlling multiple antennas 16.

In indoor environment settings, the wireless transmitter and receiver are typically fixed or slowly moving, as in 801.11 wireless local area networks. Such particularity results in a slow fading channel for which there is a probability that the transmitted area will be affected by a deep fade and received in error. Since the channel is slowly changing, it is not possible to code over several fades and average over the channel variations. Thus the system performance is limited by the deep fades causing the majority of error events. The performance of slowly fading channel is therefore often characterized by their outage, which represents the probability that the system will not be able to provide a given service.

First Algorithm: Radiation Pattern Averaging

The purpose of the first algorithm is to improve the outage performance of MIMO wireless systems in slowly fading environments. Either the transmit antennas, the receive antennas, or both, hope over a fixed set of K different radiation patterns with a hopping rate slow enough to enable coherent demodulation over each hop (i.e. over several symbol period) but fast enough to send a codeword over the K radiation pattern hops. The radiation patterns hopping is therefore transforming the slowly fading channel in a block fading channel where coding will mitigate the effects of channel deep fades. As K tends to infinity, the channel becomes fast fading and the performance converges to the average performance of all channels. On the other hand, for a finite K, the outage performance will significantly improve due to the hopping diversity gain.

The first algorithm is thus simple, and requires no channel state information, neither at the transmitter nor at the received. The only constraint is on the synchronization of the hopping instant with the symbol transmission.

Second Algorithm: Radiation Pattern Maximizing

The second algorithm uses a rudimentary form of feedback to further improve the performance. More particularly, the receive antennas provide a fixed set of K different radiation patterns and the receiver selects the radiation pattern maximizing its performance. Such a selection may be accomplished by first scanning the K different radiation patterns and then indicating to a radiation pattern controller the selected pattern. The feedback is thus limited to the interface between a receiver algorithm, which can be implemented in the digital baseband receiver or an analog section, depending on a selection criteria used, and the antenna pattern control sections.

In the context of the present invention, other algorithms may also be used for taking benefit of the particular advantages of the dynamic radiation pattern of the antenna system of the present invention. For example, an algorithm for dynamically adapting a transmission channel by increasing diversity of received signal, thereby increasing capacity and data rate. The dynamic radiation pattern of the antenna system may further be put to profit with an algorithm which mitigates impact of interference.

Capacity Analysis

To evaluate the performance of the first and second algorithms, their respective capacity has been analyzed by way of simulation. The received signal for a given radiation pattern hop k is:

$$r_k = H_k x_k + n_k$$

where $x_k$ is the MX1 transmit vector normalized such that $E[x_k x_k^*]=1$, $H_k$ is the NXM channel transfer matrix for the $k^{th}$ hop and includes the effect of the transmit and receive radiation patterns, $n_k$ is the NX1 noise vector with identically independently distributed (iid) zero mean circular symmetric complex Gaussian (ZMCSCG) entries with $N_0$ variance, and $r_k$ is the NX1 receive vector. For simplicity reasons, it will from this point on be assumed that M=N.

For the first algorithm, a given realization consists of K MIMO channel hops. The system thus sees K parallel MIMO channels and the capacity for this system realization is:

$$C_{av} = \frac{1}{K}\sum_{k=0}^{K-1} \log_2\left(\left|I_M + \frac{\rho}{M} H_k H_k^*\right|\right)$$

where $I_M$ is an MXM identity matrix, and $$\rho = \frac{1}{N_0}$$

is the signal to noise ratio (SNR).

For the second algorithm, a given realization is the radiation pattern, out of K possible outcomes, which gives the channel with the maximum sustainable rate. The capacity for this system realization is thus given by:

$$C_{max} = \max_{k=1,\ldots,K} \log_2\left(\left|I_M + \frac{\rho}{M} H_k H_k^*\right|\right).$$

Both algorithms can be characterized by their outage probability $P_{out}(C_{av.max}^{out})=P\{C_{av.max} < C_{av.max}^{out}\}$ or their ergodic capacity $C_{av.max}^{erg}=E[C_{av.max}]$.

Simulations

The outage and ergodic capacities for both algorithms have been evaluated numerically using Monte Carlo simulations for 10000 independent system realizations. For each realization, the MIMO channels $H_k$, k=1, . . . , K, were assumed iid with iid unit variance ZMCSCG random variable elements.

Figure 4:
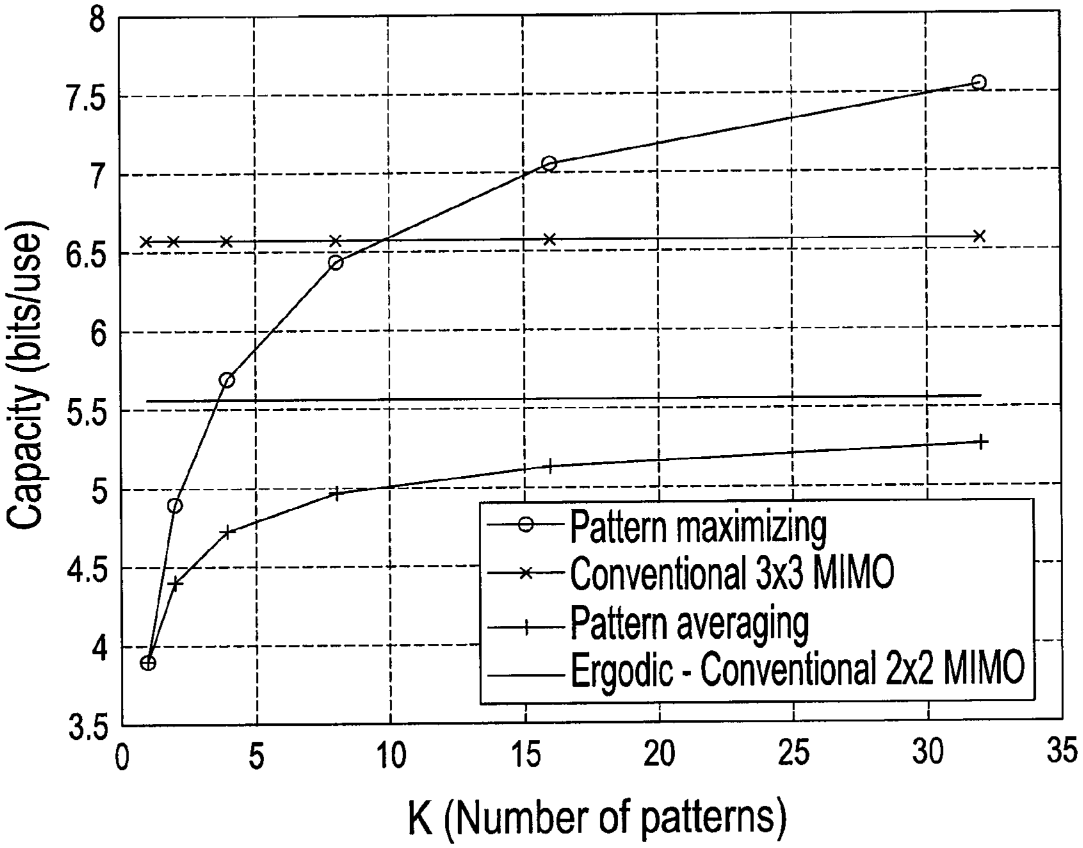
FIG. 4 illustrates a 10% outage capacity of both algorithms as a function of the number of radiation patterns K for a fixed SNR of 10 dB.

FIG. 4 illustrates a 10% outage capacity of both algorithms as a function of the number of radiation patterns K for a fixed SNR of 10 dB. The results first demonstrate that a significant improvement is achieved using the simple pattern averaging algorithm over a traditional fixed MIMO system (K=1) and that the capacity of the slow fading system using radiation pattern averaging converges toward the capacity of a conventional fast fading MIMO system (ergodic capacity). The results also show the tremendous capacity improvement that can be obtained using the feedback at the receiver with the second algorithm. Furthermore, at this medium SNR value, the capacity of the 2×2 MIMO system with radiation pattern maximizing outperforms a conventional 3×3 MIMO system. Similar results have been obtained for other MIMO and SISO configurations.

Figure 5:
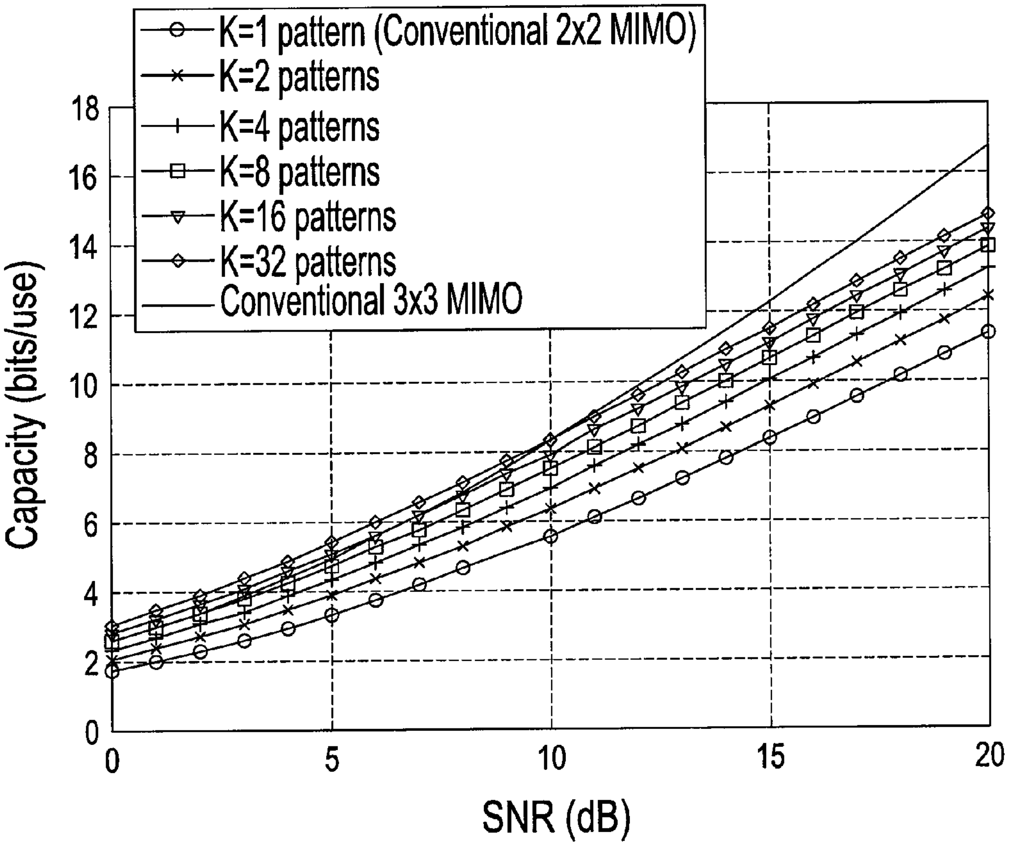
FIG. 5 shows ergodic capacity of the 2×2 MIMO system using the second algorithm.

FIG. 5 shows ergodic capacity of the 2×2 MIMO system using the second algorithm. The results show that at high SNR the slope for the 2×2 MIMO system remains constant for all values of K while the capacity increases. This indicates that as the number of possible radiation patterns grows, the diversity gain increases for a fixed multiplexing gain.

Although the present invention has been described by way of embodiments, the present antenna and antenna system of the present invention are not limited to such embodiments, but rather to the scope of protection sought in the appended claims.

The invention claimed is:

1. A dynamic radiation pattern diversity antenna system comprising:
- a transmission line defining a plurality of unit cells;
- a plurality of varactor diodes, each varactor diode being electrically connected to a corresponding unit cell; and
- a radiation pattern control unit electrically connected to each of the plurality of varactor diodes, whereby upon electrical actuation of the varactor diodes, each unit cell radiates at an angle corresponding to a voltage applied to the corresponding varactor diode.

2. The antenna system of claim 1, wherein the transmission line consists of a composite right/left handed (CRLH) microstrip leaky-wave transmission line.

3. The antenna system of claim 1, wherein each of the plurality of varactor diodes is adapted to be independently electrically controlled.

4. The antenna system of claim 3, whereby upon same electrical control of the plurality of varactor diodes, the plurality of unit cells achieve full-space scanning at a fixed operation frequency.

5. The antenna system of claim 3, whereby upon different electrical control of the plurality of varactor diodes, each one of the plurality of unit cells radiates at different angle.

6. The antenna system of claim 3, whereby upon varying electrical control of the plurality of varactor diodes, resulting radiation patterns are changed.

7. The antenna system of claim 3, wherein the radiation pattern control unit includes a radiation pattern averaging unit.

8. The antenna system of claim 3, wherein the radiation pattern control unit includes a radiation pattern maximizing unit.

* * * * *